United States Patent
Shigeta et al.

(10) Patent No.: US 10,509,853 B2
(45) Date of Patent: Dec. 17, 2019

(54) CREATING AN ANNOTATION PANE FOR A DOCUMENT BY AUGMENTING THE DOCUMENT

(71) Applicant: Microsoft Technology Licensing, LLC, Redmond, WA (US)

(72) Inventors: Ryo Shigeta, Redmond, WA (US); Ryogo Kanatani, Redmond, WA (US); Shohei Ono, Redmond, WA (US); Yusuke Bou, Redmond, WA (US); Christian Whitehead, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 14/479,209

(22) Filed: Sep. 5, 2014

(65) Prior Publication Data
US 2016/0070687 A1 Mar. 10, 2016

(51) Int. Cl.
*G06F 17/24* (2006.01)
*G06F 3/0481* (2013.01)

(52) U.S. Cl.
CPC .......... *G06F 17/241* (2013.01); *G06F 3/0481* (2013.01)

(58) Field of Classification Search
CPC .............................. G06F 17/241; G06F 3/0481
USPC ........................................................ 715/232
See application file for complete search history.

(56) References Cited

U.S. PATENT DOCUMENTS

| | | | |
|---|---|---|---|
| 5,146,552 A * | 9/1992 | Cassorla | G06F 17/241 715/200 |
| 6,230,171 B1 * | 5/2001 | Pacifici | G06F 17/241 707/E17.111 |
| 6,549,220 B1 * | 4/2003 | Hsu | G06F 17/30873 707/E17.111 |
| 7,178,099 B2 * | 2/2007 | Meyer | G06Q 10/107 715/210 |
| 8,640,023 B1 * | 1/2014 | Murray | G06F 16/954 715/232 |
| 2002/0049787 A1 * | 4/2002 | Keely | G06F 17/211 715/205 |
| 2003/0023754 A1 * | 1/2003 | Eichstadt | G06F 16/954 709/246 |

(Continued)

FOREIGN PATENT DOCUMENTS

EP 0902379 A2 3/1999
EP 1486883 A2 12/2004

OTHER PUBLICATIONS

W3Schools, "The HTML DOM," Nov. 14, 2012, W3Schools.com, <http://www.w3schools.com/JS/js_htmldom.asp>.*

(Continued)

*Primary Examiner* — Stephen S Hong
*Assistant Examiner* — Broderick C Anderson
(74) *Attorney, Agent, or Firm* — Michael Best & Friedrich LLP

(57) ABSTRACT

Annotation methods and systems for supporting the annotation of documents in the format of a rendering engine are provided. The annotation system allows for the adding of annotations to documents, the displaying of annotations over content of the documents, and the displaying of annotations in an annotation pane. To provide annotation support for a document, the annotation system augments the document with elements including an element with annotation engine code and elements to support the collecting and displaying of annotations. When the rendering engine renders the document, it executes the annotation engine code to effect the collecting and displaying of the annotations.

23 Claims, 19 Drawing Sheets

(56) References Cited

U.S. PATENT DOCUMENTS

| | | | | |
|---|---|---|---|---|
| 2004/0172595 A1* | 9/2004 | Lerner | ................ | G06F 3/04883 |
| | | | | 715/201 |
| 2004/0205542 A1* | 10/2004 | Bargeron | .............. | G06F 17/241 |
| | | | | 715/201 |
| 2014/0053051 A1* | 2/2014 | Chen | ....................... | G06F 16/95 |
| | | | | 715/211 |
| 2014/0164900 A1 | 6/2014 | Zeng et al. | | |

OTHER PUBLICATIONS

"Inject HTML and JavaScript into an existing page with BHO using MS Visual Studio 2010 and C#"; Inacent.com; The Code Project; <http://www.codeproject.com/Articles/149258/Inject-HTML-and-JavaScript-into-an-existing-page-w>; Published prior to Feb. 8, 2012.*

"Automatic Table of Contents"; Chris Coyier; CSS-Tricks; <http://css-tricks.com/automatic-table-of-contents/>; Published prior to: Apr. 20, 2013.*

"How Javascript Loading Works—DOMContentLoaded and OnLoad"; Pan Thamakos; a.blog.about.code.; <https://ablogaboutcode.com/2011/06/14/how-javascript-loading-works-domcontentloaded-and-onload> (Year: 2011).*

International Search Report and Written Opinion Issued in PCT Application No, PCT/US2015/048443, dated Dec. 15, 2015, 11 Pages.

"Second Written Opinion Issued in PCT Application No. PCT/US2015/048443," dated Jul. 18, 2016, 5 Pages.

"International Preliminary Report on Patentability Issued in PCT Application No. PCT/US2015/048443", dated Nov. 18, 2016, 6 Pages.

* cited by examiner

CREATING AN ANNOTATION PANE FOR A DOCUMENT BY AUGMENTING THE DOCUMENT

CROSS-REFERENCE TO RELATED APPLICATIONS

This application is related to U.S. patent application Ser. No. 14/479,189, filed Sep. 5, 2014, entitled COLLECTING ANNOTATIONS FOR A DOCUMENT BY AUGMENTING THE DOCUMENT, and U.S. patent application Ser. No. 14/479,224, filed Sep. 5, 2014, entitled DISPLAYING ANNOTATIONS OF A DOCUMENT BY AUGMENTING THE DOCUMENT, which are incorporated herein by reference in their entirety.

BACKGROUND

It has been a common practice for readers of paper documents to mark up the documents with annotations. The annotations may be handwritten alphanumeric characters, punctuation marks, arbitrary symbols (e.g., smiley faces), underlining, enclosures (e.g., ovals), highlighting, and so on, which are generally referred to as "freeform ink." Readers annotate documents for a variety of reasons such as to mark important points for rapid recall (e.g., a student preparing for a test), to show needed revisions to the document (e.g., a proofreader), and to add succinct summaries of paragraphs. Many readers consider the ability to annotate a document to be important to the effective reading and processing of the content of a document.

Because of this importance, electronic document systems, such as word processing systems, also allow users to annotate electronic documents. Initially, electronic document systems allowed users to select an annotation mode, select a location in a document for the annotation, and enter the text of the annotation (e.g., via a keyboard). The text of each annotation may be stored as part of the document, much like the text of footnotes. When the document is displayed, the text of the annotation might be displayed in a margin near the location for that annotation.

Although text-based annotations can be useful, they are not nearly as expressive as the freeform ink of paper documents. Several systems have been developed to support annotation of electronic documents using "freeform digital ink." Some annotation systems have generated an electronic printout of a document, displayed that electronic printout, and allowed a user to annotate the pages of the documents using a digital pen. The user would use the digital pen to add the freeform digital ink near the associated text. Such annotation systems associated each annotation with a location on a page of the electronic printout where the freeform digital ink was drawn, rather than with the associated text. If the layout of the document changed (e.g., because of printing in landscape mode rather than portrait mode), the annotations associated with a location of the prior layout would not line up with the associated text in the new layout.

One annotation system overcame the problem of this changed layout by associating annotations with the associated text within the electronic document. This annotation system would open and display an electronic document. When a user annotated the displayed document with a digital pen, the annotation system captured the digital ink of the annotation and associated the annotation with the specific displayed text of the document. If the layout of the document changed, the annotation system could display the digital ink of the annotation with the associated text.

SUMMARY

In some embodiments, an annotation method and system for displaying annotations of a document that is in the format of a rendering engine is provided. The annotation system accesses annotations for the document, the annotations having been submitted to annotate the document at locations within the document and corresponding to digital ink placed over a rendering of the document near a location. The annotation system creates an annotation pane that includes representations of one or more annotations. The representation of an annotation includes the digital ink of the annotation. The annotation system adds the created annotation pane to the document. The annotation system then directs the rendering of the document by the rendering engine so that content of the document is displayed along with representations of the annotation pane.

In some embodiments, an annotation method and system displays the document and its annotations. The annotation system augments the document so that the annotations will be displayed in association with the associated anchor content. The annotation system identifies document display characteristics. For each annotation, the annotation system analyzes the document to identify anchor display characteristics of the anchor content when that content is rendered. The annotation system then generates a modified annotation based on the identified document display characteristics and anchor display characteristics. The annotation system then adds to the document content based on the modified annotation to effect displaying the annotation in accordance with the display characteristics when the document is displayed. The rendering engine then renders the augmented document.

In some embodiments, an annotation method and system controls the annotating of the document. The annotation system accesses the document, which has document content and is augmented with annotation-enabling code. When executing the annotation-enabling code, the rendering engine retrieves annotation engine code of an annotation engine and augments the document with the annotation engine code. When executing the annotation engine code, the rendering engine augments the document with overlay content that defines an input area to overlay rendered document content and to receive events relating to annotation, and it enables the input area to receive events relating to annotations. When inking events corresponding to submitting ink of an annotation are detected over the input area, the rendering engine stores points corresponding to the locations of the submitted ink. The rendering engine then analyzes the stored points of the annotation to identify anchor content based on the locations of the submitted ink within the input area and the location of rendered document content and associates the annotation with the anchor content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION

DETAILED DESCRIPTION

Figure 1:
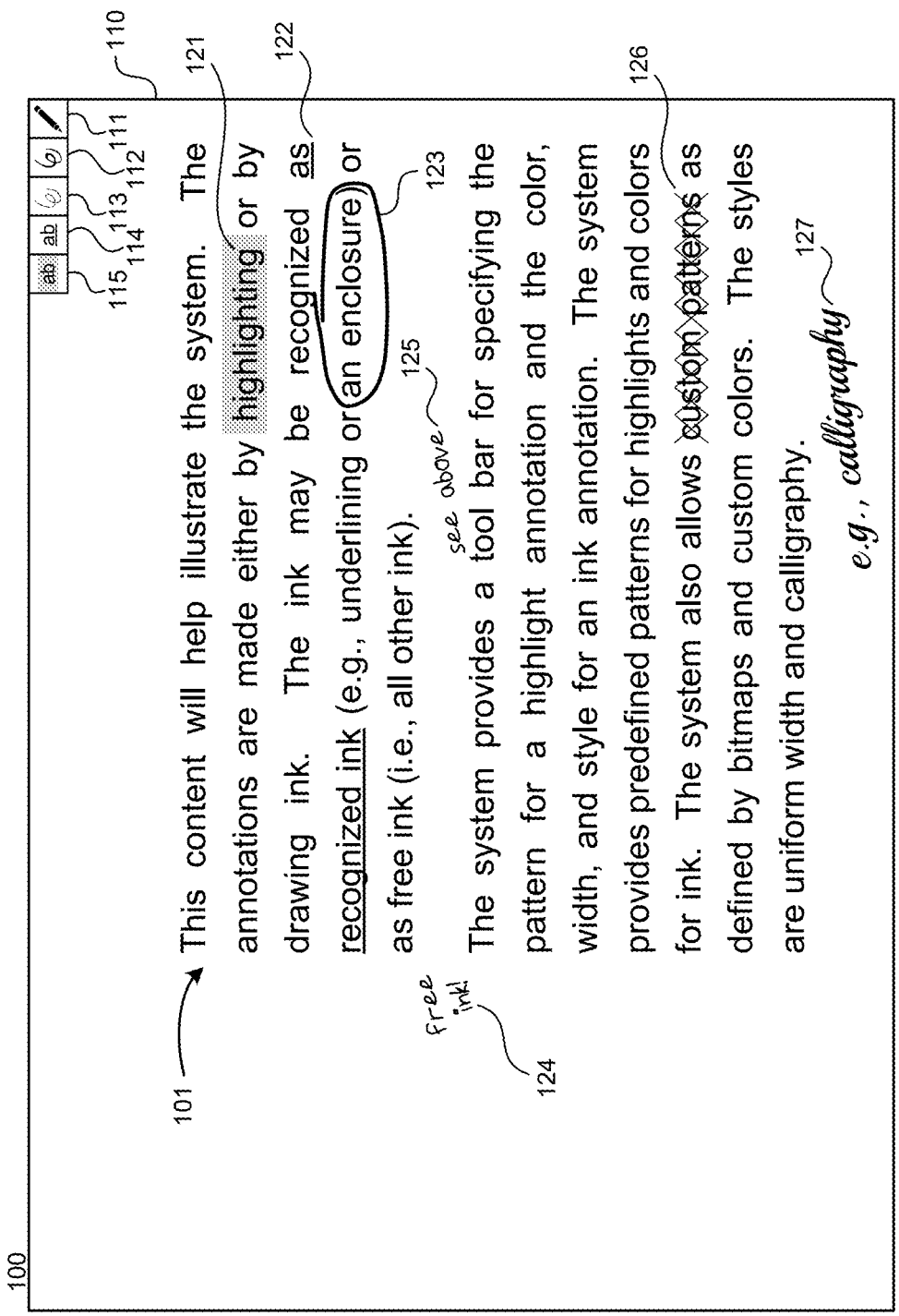
FIG. 1 illustrates a display page with a rendering of a document and annotations.

Methods and systems supporting the annotation of electronic documents (referred to as documents in the following) that are in the format of a rendering engine are provided. In some embodiments, an annotation system augments a document so that the rendering engine controls the collecting and displaying of annotations. The rendering engine supports the execution of code that is included in the document to be rendered. The annotation system may augment a document by adding annotation-supporting content such as annotation control elements and annotation format elements to the document. The annotation control elements may include executable code. When the rendering engine renders the document, the annotations are displayed in accordance with the annotation control elements (i.e., executing the code) and annotation format elements. For example, the document may be a web page in a hypertext markup language ("HTML") format or a document in another extensible markup language ("XML"), the rendering engine may be a browser rendering engine, and the executable code may be JavaScript. ("HTML5" published by the World Wide Web Consortium ("W3C") as Technical Report "CR-html5-20140731," which is hereby incorporated by reference.)

In some embodiments, the annotation system supports annotating a document in a rendering engine format that includes document content and annotation-enabling content. For example, the document may be a web page with the document content downloaded from a server to a client device by a browser executing on the client device (i.e., a computing device). The annotation-enabling content may be added to the document by the server or the client device. For example, the web browser at the client device may have a bookmarklet defined for inserting the annotation-enabling content into a web page. The annotation-enabling content may include executable annotation-enabling code for enabling the document to be annotated. When the rendering engine renders the document, it executes the annotation-enabling code, which causes code of an annotation engine to be downloaded from an annotation code server if not already available at the client device. The annotation-enabling code then augments the document with the downloaded annotation code. To annotate a document, the annotation code (i.e., annotation-enabling code or annotation engine code) augments the document with overlay content that defines an input area to overlay the rendered document content and to receive events relating to annotations. For example, the overlay content may be an element such as a "div" element of HTML. The annotation code then augments the document so that inking events (e.g., mouse movement) relating to the input area are received by the annotation engine code. For example, the annotation code may register a listener for the overlay element to receive all events relating to the input area. When the rendering engine renders the document, the annotation code detects inking events corresponding to submitting ink of an annotation and stores points corresponding to the locations of the submitted ink within the input area. The annotation engine code analyzes the stored points of the annotation to identify anchor content of the document based on the locations of the submitted ink and the location of rendered document content. The annotation engine code associates the annotation with the anchor content. The annotation system may store information that maps the document to the definition of its annotations, such as the ink and the anchor content, in an annotation repository of the client device or a remote device such as an annotation server. When the document is later rendered, its annotations can be retrieved from the annotation repository.

In some embodiments, the annotation system displays a document along with its annotations after the annotations have been collected. When annotations are to be displayed, the annotation code executed by a rendering engine augments the document so that the annotations will be displayed in association with the associated anchor content. The annotation code identifies the document display characteristics of the document. For example, the document display characteristics may include scale, window width and height, and so on. For each annotation, the annotation code analyzes the document to identify anchor display characteristics of the anchor content when that content is displayed. For example, the anchor display characteristics may relate to how text of the anchor content wraps. The annotation code generates a modified annotation based on the identified document display characteristics and anchor display characteristics. For example, the annotation code may split an underline annotation when the anchor content that was previously on one line is now split across two lines. The annotation code then adds to the document content based on the modified annotation to effect displaying the annotation in accordance with the display characteristics of the anchor content when the document is rendered. For example, the annotation code may add a "div" element to effect the rendering of the modified annotation in association with the anchor content. After performing this processing for each annotation, the rendering engine renders the document with that added elements for rendering the annotations.

In some embodiments, the annotation system displays annotations of a document in an annotation pane. The annotation code creates an annotation pane that includes representations of one or more annotations. A representation may include the digital ink of the annotation. For each annotation, the annotation code may retrieve the anchor content and perform the processing as described above to generate the modified annotations, assuming the anchor content is rendered in the annotation pane. The annotation code then adds the anchor content and modified annotation to the annotation pane. When the rendering engine renders the document, it renders the annotation pane so that the user can view a listing of the annotations. In some embodiments, the annotation system may allow a user to select an annotation from the annotation pane and change the rendered location of the document so that the selected annotation within the document pane is visible.

FIG. 1 illustrates a display page with a rendering of a document and annotations. Display page 100 includes a rendering of document 101. Display page 100 also includes an annotation toolbar 110 that contains a pen icon 111, a calligraphy tool 112, a line tool 113, an underline tool 114, and a highlight tool 115. The annotation toolbar may contain other tools such as an eraser tool for erasing annotations. The annotation system initially displays just the pen icon when annotations are enabled for the document. A user selects the pen icon to start annotating the document. When the pen icon is selected, the annotation system displays the tools 112-115 to provide the user an opportunity to select the type of annotation. When the calligraphy tool is selected, the annotation system uses a calligraphic line style for the digital ink. When the line tool is selected, the annotation system uses a plain line style for the digital ink. When the underline tool is selected, the annotation system assumes the digital ink will be for the underlining of text. When the highlight tool is selected, the annotation system assumes the digital ink will be for the highlighting of text. For each of these tools, the annotation system may allow the user to select a color or pattern for the digital ink. For example, a user may specify the color and width of the calligraphic digital ink and may specify the color and pattern for the highlighting. That annotation system may allow the user to install various custom patterns (e.g., scalable vector graphics patterns) to be used in the highlighting.

After the user selects the style for annotation, the user may input the annotation by drawing over the rendering of the document using a variety of tools such as an electronic pen, a mouse, or a touch screen. Display page 100 illustrates various types of annotations. Annotation 121 illustrates the highlight annotation style in which the annotation is anchored to the word "highlighting." Annotation 122 illustrates the line annotation style in which the annotation is anchored to the phrase "as recognized ink." Even though the underlining was drawn using the line annotation style, the annotation system recognized the shape of the digital ink as an underline. Annotation 123 illustrates the line annotation style in which the annotation is anchored to the phrase "an enclosure." Again, even though the enclosure was drawn using the line annotation style, the annotation system recognized the shape of the digital ink as corresponding to an enclosure (e.g., oval surrounding text). Annotation 124 illustrates the line annotation style in which the annotation is drawn in the left margin and may be anchored to the phrase "as free ink." The annotation system may not recognize the shape of that digital ink as corresponding to any recognized shape and may treat the annotation as being an unrecognized shape. Annotation 125 illustrates the line annotation style in which the annotation is drawn in the space above the second paragraph and is anchored to the phrase "tool bar." Annotation 126 illustrates the highlighting annotation style in which the annotation is anchored to the phrase "custom patterns." In this case the pattern for the highlighting is specified as a scalable vector graphic ("SVG") element for the shape of "X." Annotation 127 illustrates the calligraphy annotation style in which the annotation is drawn in the bottom margin and is anchored to the word "calligraphy." A document may have top, bottom, left, and right margins along with margins within content of the document. For example, if the content contains two columns, then the space between the columns may be considered to be an intra-content margin.

Figure 2:
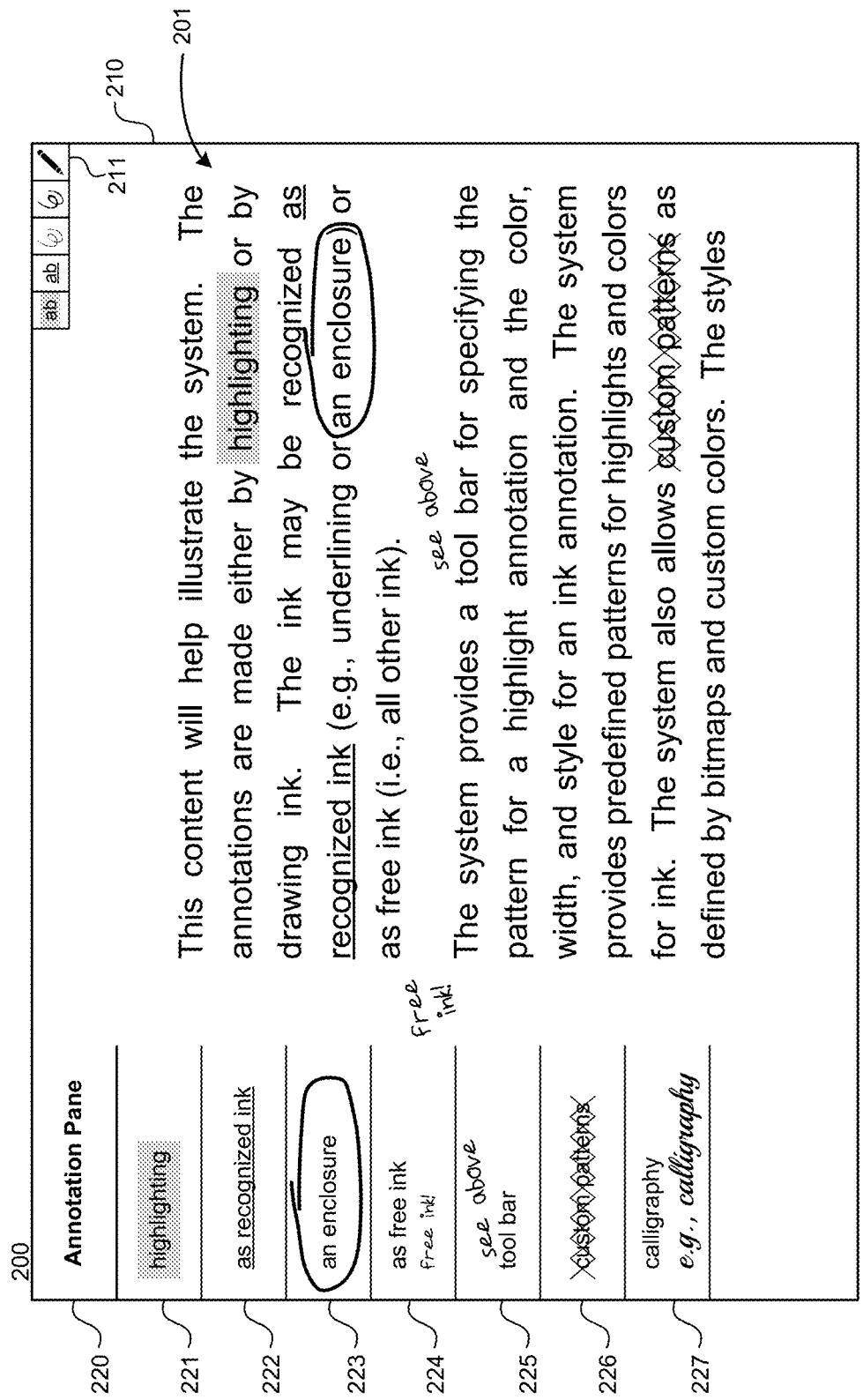
FIG. 2 illustrates a display page containing a rendering of the document along with an annotation pane.

FIG. 2 illustrates a display page containing a rendering of the document along with an annotation pane. Display page 200 includes a rendering of the document 201 and a tool bar 210 that contains only a pen icon 211. The annotation system may change the characteristic of the pen icon to indicate when the annotation system is in annotation mode. The annotation system has augmented the document so that annotations 121-127 are displayed when the document is rendered. Since the size of the text of the rendered document has been reduced to accommodate the annotation pane, the annotation system has modified the annotations to accommodate the reduced size (e.g., scaling the annotations). Display page 200 also includes an annotation pane 220 with the content of the document being displayed in a document content pane that is to the right of the annotation pane. The annotation pane includes entries 221-227 for the annotations. Each entry contains an indication of the corresponding annotation and the anchor content. The annotation pane may be scrollable to view additional annotations. When a user selects an annotation from the annotation pane, the annotation system renders the document so that the selected annotation is visible. In this example, annotation 127 is not visible in display page 200. When a user selects the entry 227, the annotation system renders the document so that annotation 127 is visible.

Figure 3:
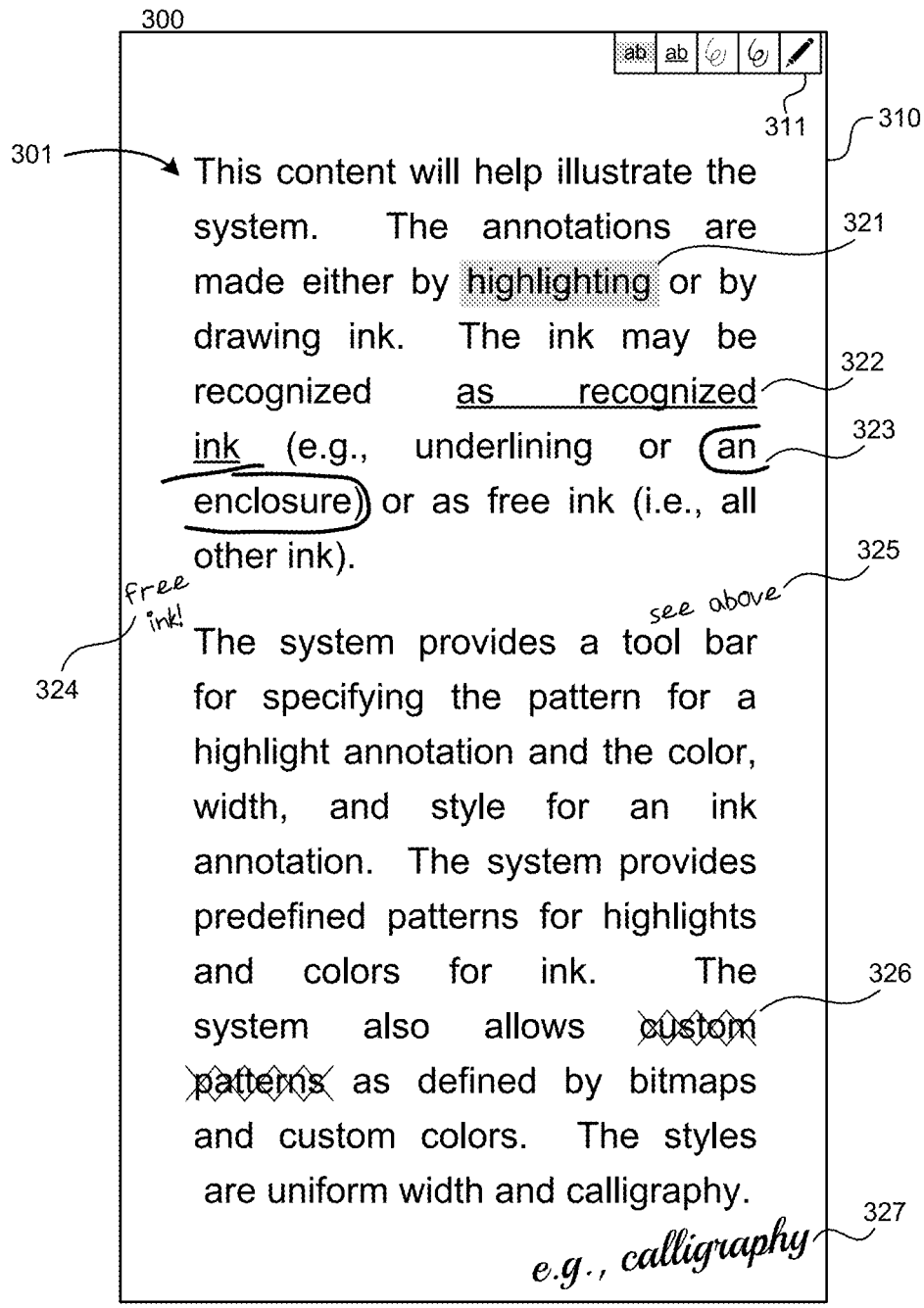
FIG. 3 illustrates a display page containing a rendering of the document in a different layout with annotations.

FIG. 3 illustrates a display page containing a rendering of the document in a different layout with annotations. Display page 300 includes a rendering of the document 301 and a toolbar 310 that contains only a pen icon 311. The rendering engine has laid out the document based on the narrow width of the display page. Display pages 100 and 200 may be laid out for a device with a large display (e.g., desktop computer), and display page 300 may be laid out for a device with a small display (e.g., a smart phone). The annotation system has modified annotations 321-327 to accommodate the new layout. Annotations 322, 323, and 326 are modifications of annotations 122, 123, and 126. The annotation system modified these annotations because their anchor text is split differently across lines of the document in the renderings of display pages 100 and 300.

Figure 4:
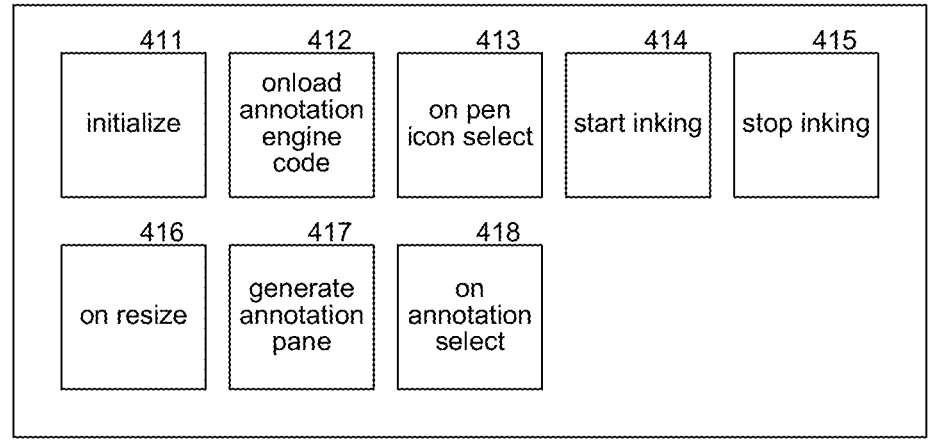
FIG. 4 is a block diagram that illustrates components of the annotation system in some embodiments.
Figure 4:
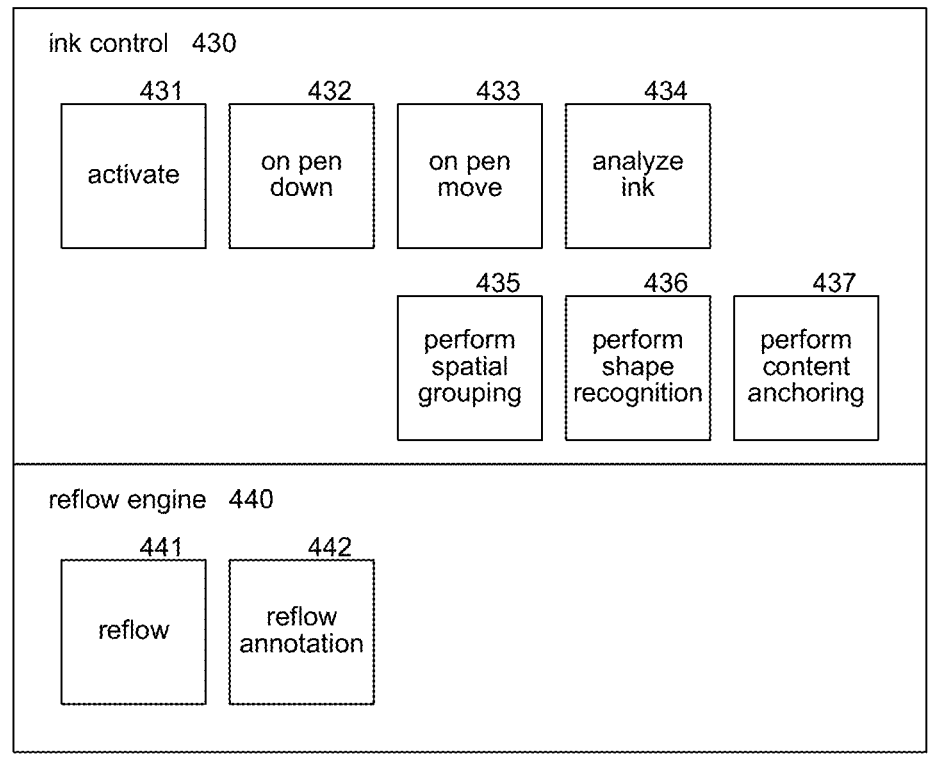

FIG. 4 is a block diagram that illustrates components of the annotation system in some embodiments. The annotation system includes annotation code comprising annotation-enabling code 410 and annotation engine code 420. The annotation-enabling code represents code that is added to a document in which annotations are to be enabled. When an annotation-enabled document is rendered, the annotation-enabling code is executed. The annotation-enabling code may be responsible for loading the annotation engine code into the document, providing the annotation toolbar, and providing the annotation pane. The annotation-enabling code includes an initialize component 411, an on load annotation engine code component 412, an on pen icon select component 413, a start inking component 414, a stop inking component 415, an on resize component 416, a generate annotation pane component 417, and an on annotation select component 418. The initialize component is invoked when the document is initially rendered and is responsible for loading the annotation engine code into the document. The on load annotation engine code is invoked after the annotation engine code has been loaded to augment the document with elements to support the annotation toolbar and the collecting of the digital ink for the annotations. The on pen icon select component is invoked when a user clicks on the pen icon to enable or disable the annotation mode by invoking the start inking component or the stop inking component. The on resize component is invoked to modify the annotations to accommodate the current layout when the document is rendered. The generate annotation pane component is invoked when the user selects to display an annotation pane. The on annotation select component is invoked when the user selects an annotation from the annotation pane to display the portion of the document to which the annotation is anchored.

The annotation engine code includes an ink control component 430 and a reflow engine component 440. The ink control component controls the collecting of the digital ink of the annotations, and the reflow engine component controls the display of annotations that have been collected. The ink control component includes an activate component 431, an on mouse down component 432, an on mouse move component 433, an analyze ink component 434, a perform spatial grouping component 435, a perform shape recognition component 436, and a perform content anchoring component 437. The activate component is invoked when the annotation mode is enabled to augment the document so that annotation events will be sent to the ink control component. The on pen down component, on pen move component, and an on pen up component (not illustrated) are invoked to store points of the digital ink as the digital pen is moved. The analyze ink component is invoked to analyze the ink to group the digital ink into annotations, recognize the shape of the annotations, and anchor the annotations to document content by invoking the perform spatial grouping component, the perform shape recognition component, and the perform content anchoring component. The reflow engine component includes a reflow component 441 and a reflow annotation component 442. The reflow component is invoked to modify the annotations to accommodate the current layout for the document. The reflow component invokes the reflow annotation component for each annotation to modify the annotation as appropriate based on the layout of the anchor content.

Although the annotation code may in some embodiments be implemented as separate annotation-enabling code and annotation engine code as described, the functions of the annotation system may be combined or separated in different ways. For example, code to support the user interface aspects (e.g., toolbar) may be included as a separate code from the annotation-enabling code and may be part of the annotation engine code. Also, the annotation system may be used and/or modified to be used in conjunction with documents that are natively in the format of a rendering engine. In such a case, the document may be converted to a format of the rendering engine.

The computing devices and systems on which the annotation system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touchscreens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that includes computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the annotation system. The data transmission media is used for transmitting data via transitory, propagating signals or carrier waves (e.g., electromagnetism) via a wired or wireless connection.

The annotation system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the annotation system may be implemented in hardware using, for example, an application-specific integrated circuit ("ASIC").

Figure 5:
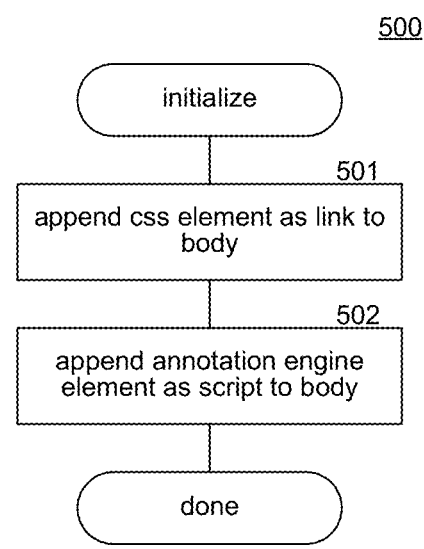
FIG. 5 is a flow diagram that illustrates the processing of an initialize component of the annotation-enabling code in some embodiments.

FIG. 5 is a flow diagram that illustrates the processing of an initialize component of the annotation-enabling code in some embodiments. The component 500 is invoked when an annotation-enabled document is rendered. The component augments the document with annotation engine code to support annotations. In block 501, the component augments the document with elements for cascading style sheets for formatting various user interface aspects of the annotation system such as the annotation toolbar and the annotation pane. In block 502, the component augments the document with a script element that contains the annotation engine code. The component then completes. The component may download the annotation engine code from a server.

Figure 6:
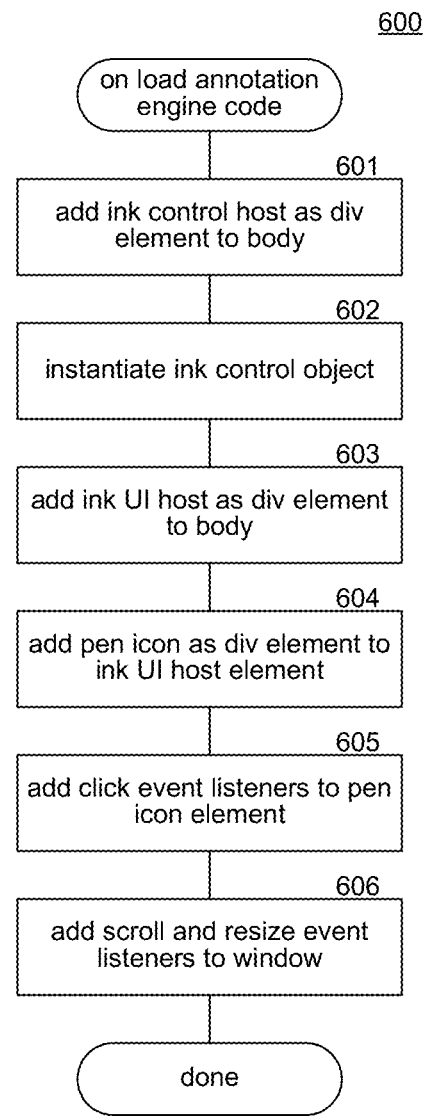
FIG. 6 is a flow diagram that illustrates the processing of an on load annotation engine code component of the annotation-enabling code in some embodiments.

FIG. 6 is a flow diagram that illustrates the processing of an on load annotation engine code component of the annotation-enabling code in some embodiments. The component 600 is invoked after the annotation engine code is loaded to complete initialization of the annotation system. In block 601, the component adds an ink control host element to the body of the document for overlaying the rendered document with a transparent window for collecting events and displaying the digital ink as the annotations are collected. For example, the ink control host element may include a CANVAS element for receiving the ink of the annotations and scalable vector graphics ("SVG") elements for rendering the annotations. In block 602, the component instantiates an ink control object of the annotation engine code. The ink control object provides functions implementing the components of the ink control component. In block 603, the component adds an ink UI host element to the body of the document for supporting the annotation toolbar. In block 604, the component adds a pen icon element to the ink UI host element for displaying the pen icon of the annotation toolbar. In block 605, the component adds a click event listener to the pen icon element to detect the disabling and enabling of the annotation mode by a user. In block 606, the component adds scroll and resize event listeners to the window in which the document is rendered to collect events relating to a change in layout of the document.

Table 1 illustrates an example snippet of HTML generated by the annotation system for inputting and rendering of annotations. The annotation system uses the CANVAS element for displaying the ink as the user enters the annotations. The annotation system uses the first SVG element to render highlight annotations and the second SVG element to render ink.

TABLE 1

```
<div id="inkControlHost"
    style="
        left: 0px;
        top: 0px;
        width: 1349px;
        height: 5121px;
        position: absolute;
        pointer-events: none;
    "
>
    <svg xmlns="http://www.w3.org/2000/svg"
    id="msInkSmartSvgElem_0"
        style="
            margin: 0px;
            padding: 0px;
            border: currentColor;
            border-image: none;
            left: 0px;
            top: 0px;
            width: 1349px;
            height: 5121px;
            overflow: hidden;
            position: absolute;
            background-color: transparent;
        "
        pointer-events="none"
        viewBox="0 0 1349 5121"
        preserveAspectRatio="none meet"
        width="1349"
        height="5121"
    >
        <g class="msInkStrokeContainer" opacity="0.3">
            <rect
                fill="#ffff40"
                transform="scale(1) rotate(0) translate(424.04 213.6)"
                x="0"
                y="0"
                width="56.53"
                height="22.29"
            />
```

TABLE 1-continued

```
            [Highlight Rendering]
        </g>
    </svg>
    <svg xmlns="http://www.w3.org/2000/svg"
    id="msInkSvgElem_0"
        style="
            margin: 0px;
            padding: 0px;
            border: currentColor;
            border-image: none;
            left: 0px;
            top: 0px;
            width: 1349px;
            height: 5121px;
            overflow: hidden;
            position: absolute;
            background-color: transparent;
        "
        pointer-events="none"
        viewBox="0 0 1349 5121"
        preserveAspectRatio="none meet"
        width="1349"
        height="5121"
    >
        <g id="msInkGroup_1"
            transform="translate(580 140)"
        >
            <g>
                <path
                    fill="none"
                    stroke="#ff471d"
                    stroke-linecap="round"
                    stroke-linejoin="round"
                    stroke-width="1"
                    d="M 1 58 L 2.56 56.39 [INK STROKE RENDERING]
                />
            </g>
        </g>
    </svg>
    <canvas
        width="1349"
        height="615"
        id="msInkCanvas_0"
        style="
            margin: 0px;
            padding: 0px;
            border: currentColor;
            border-image: none;
            left: 0px;
            top: 0px;
            width: 1349px;
            height: 615px;
            display: none;
            position: absolute;
            cursor: default;
            opacity: 1;
            pointer-events: all;
            touch-action: none;
        "
    >
    </canvas>
</div>
```

Figure 7:
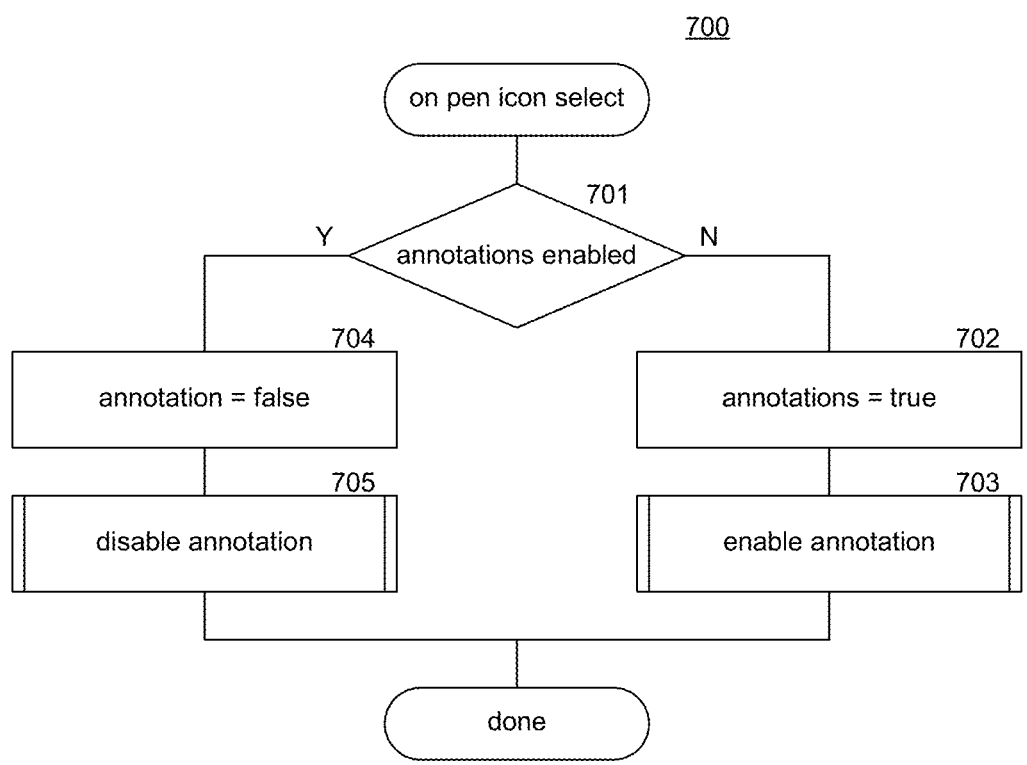
FIG. 7 is a flow diagram that illustrates the processing of an on pen icon select component of the annotation-enabling code in some embodiments.

FIG. 7 is a flow diagram that illustrates the processing of an on pen icon select component of the annotation-enabling code in some embodiments. The component 700 is invoked when a user clicks on the pen icon of the annotation toolbar. In decision block 701, if annotations are currently enabled, then the component continues at block 704, else the component continues at block 702. In block 702, the component sets a flag indicating that the annotation mode is enabled. In block 703, the component invokes the enable annotation component and then completes. In block 704, the component sets a flag indicating that the annotation mode is disabled. In block 705, the component invokes the disable annotations component and then completes.

Figure 8:
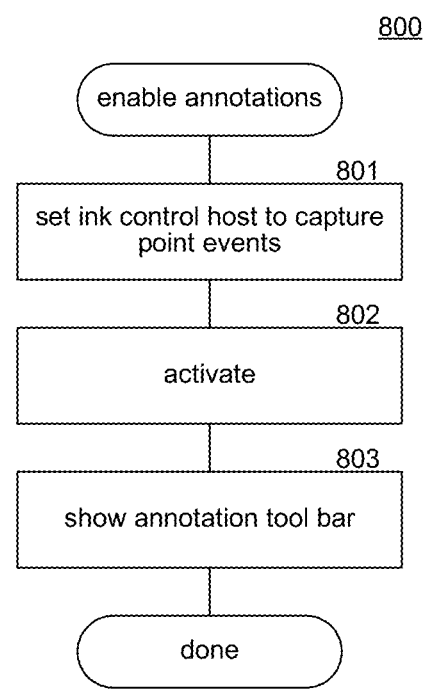
FIG. 8 is a flow diagram that illustrates the processing of an enable annotations component of the annotation-enabling code in some embodiments.

FIG. 8 is a flow diagram that illustrates the processing of an enable annotations component of the annotation-enabling code in some embodiments. The component 800 is invoked when a user indicates to enable the collecting of annotations. In block 801, the component modifies the ink control host element to start capturing pointer events. In block 802, the component invokes an activate component of the annotation engine code to initialize the collecting of annotations. In block 803, the component modifies the ink UI host element to display the tools of the annotation toolbar. The component then completes. The annotation system also augments the document so that when a tool is selected, the annotation system is configured to support the style of annotation as the user draws the ink of an annotation.

Figure 9:
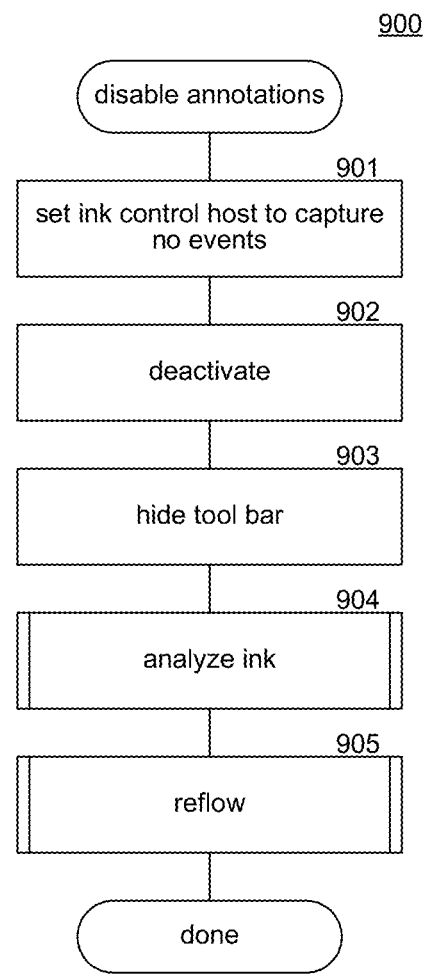
FIG. 9 is a flow diagram that illustrates the processing of a disable annotations component of the annotation-enabling code in some embodiments.

FIG. 9 is a flow diagram that illustrates the processing of a disable annotations component of the annotation-enabling code in some embodiments. The component 900 is invoked when a user indicates to disable the collecting of annotations. In block 901, the component modifies the ink control host element so that pointer events are no longer captured. In block 902, the component invokes a deactivate component of the annotation engine code to deactivate the collecting of annotations. In block 903, the component modifies the ink UI host element to no longer display the tools of the annotation toolbar. In block 904, the component invokes the analyze ink component of the ink control component to identify the annotations and anchor the annotations to document content. In block 905, the component invokes the reflow component of the reflow engine component to augment the document with elements for displaying the collected annotations. The component then completes. In some embodiments, the annotation system may analyze the ink dynamically as the user enters the ink. In such embodiments, the annotation system may group the ink into an annotation as each stroke of ink is entered and identify the anchor content.

Figure 10:
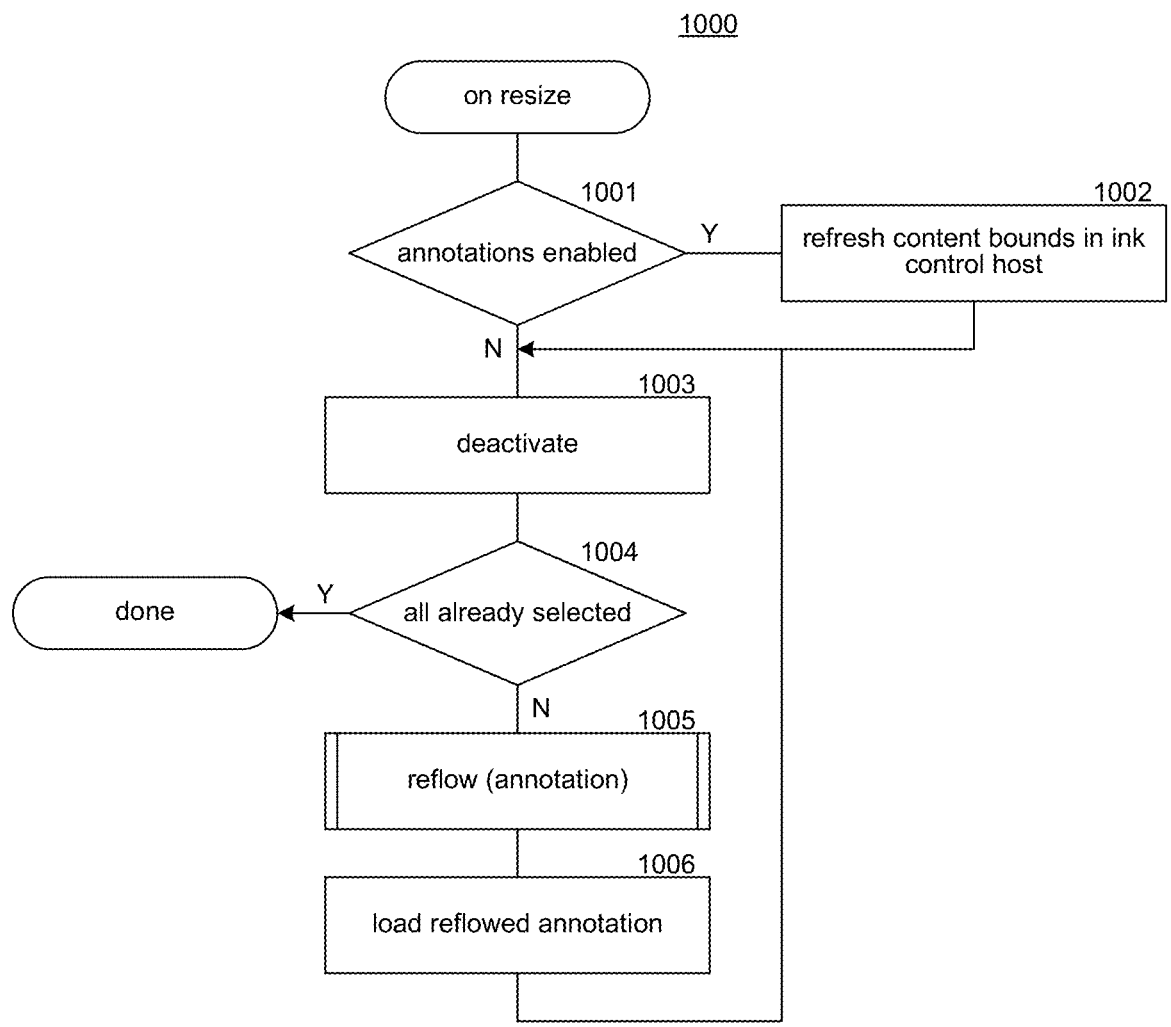
FIG. 10 is a flow diagram that illustrates the processing of an on resize component of the annotation-enabling code in some embodiments.

FIG. 10 is a flow diagram that illustrates the processing of an on resize component of the annotation-enabling code in some embodiments. The component 1000 is invoked when the window in which the document has been rendered is resized. In decision block 1001, if annotations are currently enabled, then the component continues at block 1002, else the component continues at block 1003. In block 1002, the component refreshes the content bounds in the ink control host element so that any ink that is currently being collected can be adjusted to accommodate the new layout. In blocks 1003-1006, the component loops, modifying each of the previously collected annotations to support the resized window. In block 1003, the component selects the next annotation. In decision block 1004, if all the annotations have already been selected, then the component completes, else the component continues at block 1005. In block 1005, the component invokes the reflow component of the reflow engine component, passing the selected annotation. In block 1006, the component invokes a load reflowed annotation component of the ink control component to add an element to or modify an existing element of the document corresponding to the reflowed annotation. The component then loops to block 1003 to select the next annotation.

Figure 11:
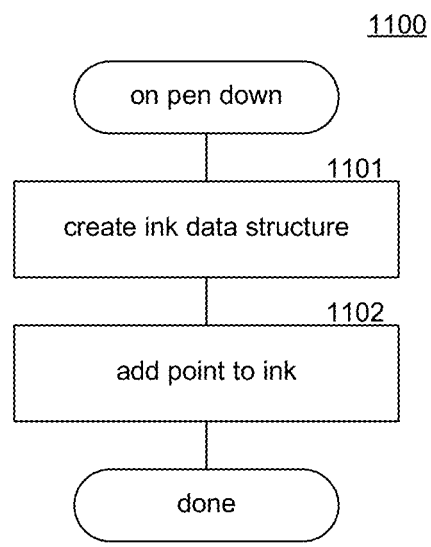
FIG. 11 is a flow diagram that illustrates the processing of an on pen down component of the ink control component in some embodiments.

FIG. 11 is a flow diagram that illustrates the processing of an on pen down component of the ink control component in some embodiments. The component 1100 is invoked when annotations are enabled and a pen down event is detected. In block 1101, the component initializes the data structure for collecting the ink while the mouse is down. In block 1102, the component adds a point to the ink corresponding to the position of the pen down event. The component then completes.

Figure 12:
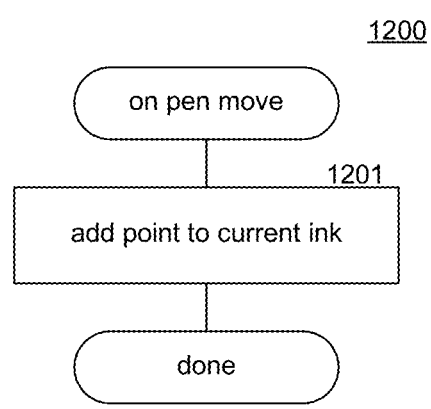
FIG. 12 is a flow diagram that illustrates the processing of an on pen move component of the ink control component in some embodiments.

FIG. 12 is a flow diagram that illustrates the processing of an on pen move component of the ink control component in some embodiments. The component 1200 is invoked when a pen move event is detected when ink is being collected. In block 1201, the component adds a point to the current ink and then completes.

Figure 13:
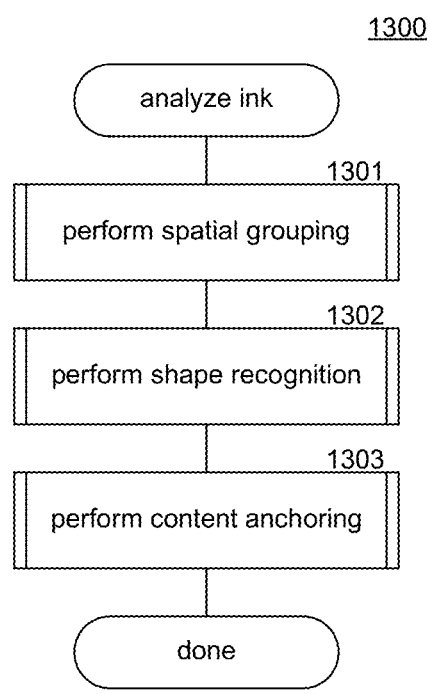
FIG. 13 is a flow diagram that illustrates the processing of an analyze ink component of the ink control component in some embodiments.

FIG. 13 is a flow diagram that illustrates the processing of an analyze ink component of the ink control component in some embodiments. The component 1300 is invoked by the annotation-enabling code to analyze the ink that has been collected. In block 1301, the component invokes the perform spatial grouping component to group the ink into annotations. In block 1302, the component invokes the perform shape recognition component to determine whether the shapes of the annotations can be recognized. In block 1303, the component invokes the perform content anchoring component to anchor the annotations to content within the document. The component then completes.

Figure 14:
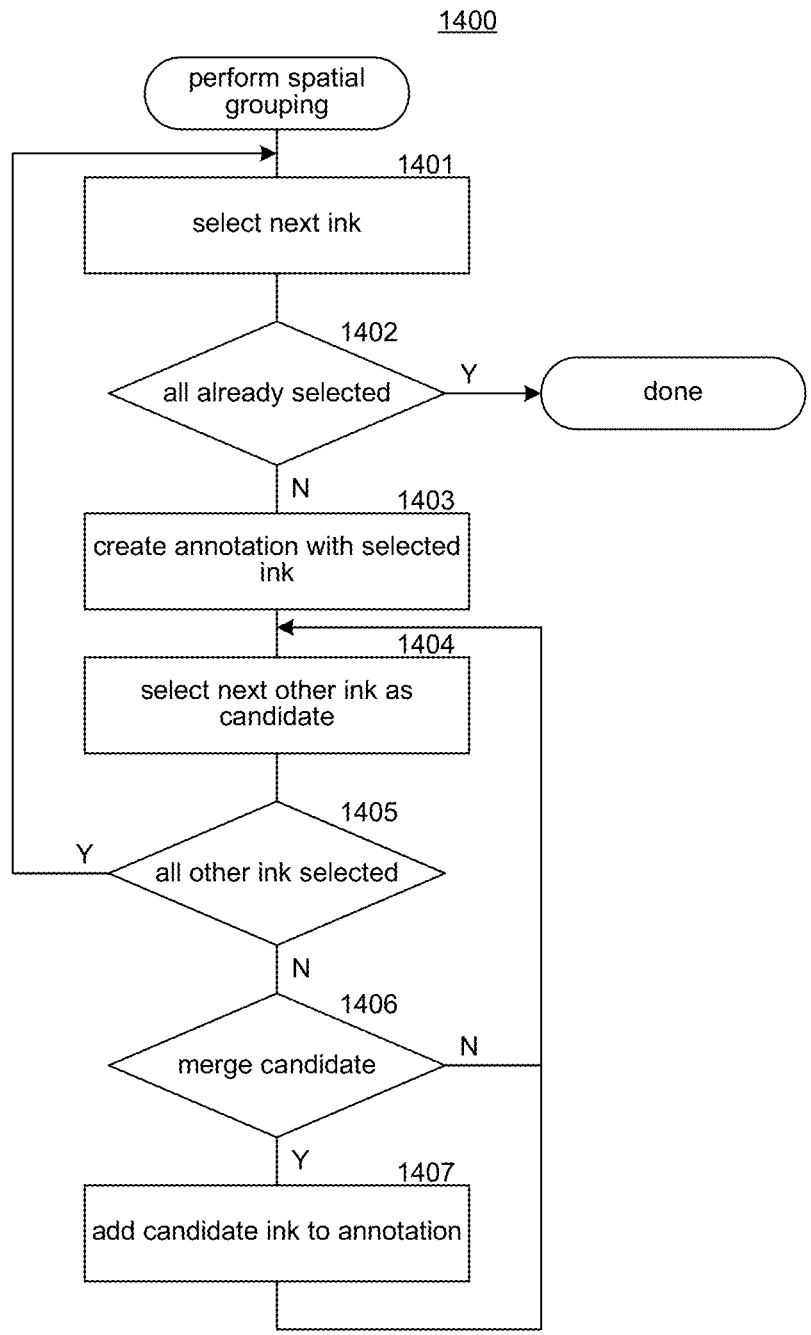
FIG. 14 is a flow diagram that illustrates the processing of a perform spatial grouping component of the ink control component in some embodiments.

FIG. 14 is a flow diagram that illustrates the processing of a perform spatial grouping component of the ink control component in some embodiments. The component 1400 is invoked to group the ink (e.g., strokes of ink) that has been collected into annotations. In block 1401, the component selects the next ink that has not been grouped into an annotation. In decision block 1402, if all the ink has already been selected, then the component completes, else the component continues at block 1403. In block 1403, the component creates a new annotation that includes the selected ink. In decision blocks 1404-1407, the component loops, checking to see whether other ink is part of the same annotation as the selected ink. In block 1404, the component selects the next other ink as candidate ink. In decision block 1405, if all the other inks have already been selected as candidate inks, then the component loops to block 1401 to select the next ink, else the component continues at block 1406. In decision block 1406, if the candidate ink is part of the current annotation, then the component continues at block 1407, else the component loops to block 1404 to select the next other ink as a candidate ink. The component may determine that the candidate ink is part of the current ink based on proximity of the candidate ink to the ink of the current annotation. The component may use a classifier trained using a machine learning technique (e.g., a support vector machine) to determine what inks should be grouped together as an annotation or may use the algorithm described below. In block 1407, the component adds the candidate ink to the annotation and loops to block 1404 to select the next other ink as a candidate ink.

In some embodiments, the spatial grouping component groups strokes based on a spatial score and a temporal score generated for the strokes. The grouping is based on an assumption that strokes that are drawn close to each other both in distance and time are more likely part of the same annotation. The spatial score for two strokes is a score indicating based on distance characteristics between the two strokes whether the strokes are part of the same annotation. The distance characteristics may be based on characteristics of the bound rectangles of the strokes. The temporal score for two strokes indicates the time between the completion of one stroke and the start of the other stroke.

The component performs two passes to group strokes. The first pass processes the strokes in order of the time they were drawn, and the second pass processes strokes irrespective of time to account for strokes of an annotation drawn out of sequence (e.g., a correction to an annotation such as crossing the letter "t"). In the first pass, the component compares pairs of strokes that are drawn sequentially in time. For each pair of strokes, if the spatial score and the temporal score satisfy a grouping criterion, the strokes are grouped together. For example, the grouping criterion may be satisfied when the sum of the spatial score and the temporal score exceeds a threshold. Thus, the component groups together a sequence of strokes when each pair of sequential strokes satisfies the grouping criterion. In the second pass, the component compares spatial scores for the strokes within a pair of groups of strokes (note: a group may have only one stroke) satisfy a merge criterion (e.g., are close enough). If so, the component merges the strokes of the pair of groups.

In some embodiments, the component generates the spatial score for a pair of strokes A and B based on bounding rectangles of the strokes as follows. In the following, the corners of the bounding rectangle for stroke A are represented as $$(A_{x_1}, A_{y_1}), (A_{x_1}, A_{y_2}), (A_{x_2}, A_{y_1}), \text{ and } (A_{x_2}, A_{y_2})$$

where $A_{x_1} < A_{x_2}$ and $A_{y_1} < A_{y_2}$ and the corners of the bounding rectangle for stroke B are represented as:

$$(B_{x_1}, B_{y_1}), (B_{x_1}, B_{y_2}), (B_{x_2}, B_{y_1}), \text{ and } (B_{x_2}, B_{y_2})$$

where $B_{x_1} < B_{x_2}$ and $B_{y_1} < B_{y_2}$. When the bounding rectangles overlap, the component calculates an x-axis score and a y-axis score as the length of the non-overlapping portion of the shorter bounding rectangle divided by the length of the shorter bounding rectangle in each direction. Assuming the bounding rectangle for stroke A is shorter in each direction, the component calculates the x-axis score and the y-axis score as follows:

$$X = ((\max(A_{x_2}, B_{x_2}) - \min(A_{x_1}, B_{x_1})) - (B_{x_2} - B_{x_1})) / (A_{x_2} - A_{x_1})$$

$$Y = ((\max(A_{y_2}, B_{y_2}) - \min(A_{y_1}, B_{y_1})) - (B_{y_2} - B_{y_1})) / (A_{y_2} - A_{y_1})$$

where X is the x-axis score and Y is the y-axis score. A score of 0.0 indicates that shorter bounding rectangle in that direction is completely overlapped by the longer bounding rectangle, and a score approaching 1.0 indicates an increasing smaller portion of the shorter bounding rectangle overlaps. When the bounding rectangles do not overlap, the component calculates the x-axis score and the y-axis score by first calculating the distance between the bounding boxes in each direction as follows:

$$D_x = \max(A_{x_2}, B_{x_2}) - \min(A_{x_1}, B_{x_1}) - (A_{x_2} - A_{x_1}) - (B_{x_2} - B_{x_1})$$

$$D_y = \max(A_{y_2}, B_{y_2}) - \min(A_{y_1}, B_{y_1}) - (A_{y_2} - A_{y_1}) - (B_{y_2} - B_{y_1})$$

where $D_x$ and $D_y$ represent the distance in the x direction and y direction, respectively. The component then approximates the problem space as follows:

$$L = (A_{x_2} - A_{x_1}) + (A_{y_2} - A_{y_1}) + (B_{x_2} - B_{x_1}) + (B_{y_2} - B_{y_1})$$

where L represents the sum of the height and width of the rectangles. The component then calculates the x-axis score and the y-axis score when the bounding rectangles do not overlap as follows:

$$X = 1.0 + D_x^{1.5}/L$$

$$Y = 1.0 + D_y^{1.5}/L$$

where the addition of 1.0 ensures that strokes with non-overlapping bounding rectangles have a higher score than strokes with overlapping bounding rectangles and where the power of 1.5 helps ensure that the scores are smaller when the strokes, such as strokes of the same text character, are closer together. The component that calculates the spatial score as follows:

$$S = 1.0/(X^2 + Y^2)^{1/2}$$

A spatial score approaching infinity indicates that one bounding rectangle completely overlaps the other bounding rectangle.

Figure 15:
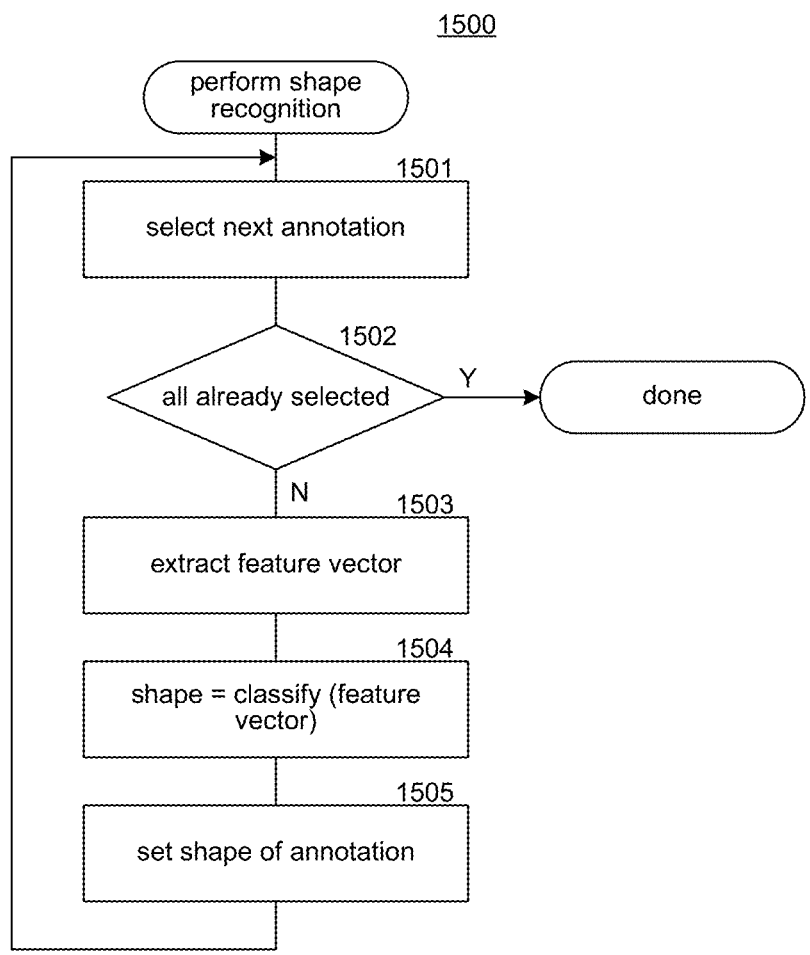
FIG. 15 is a flow diagram that illustrates the processing of a perform shape recognition component of the ink control component in some embodiments.

FIG. 15 is a flow diagram that illustrates the processing of a perform shape recognition component of the ink control component in some embodiments. The component 1500 may use a classifier (e.g., a binary classifier) that has been trained using a machine learning technique to recognize the shape of annotations or may use a rules engine that applies rules developed by an expert for recognizing shapes. The shapes of annotations may include single line underlining, double line underlining, enclosures (e.g., ovals), and arrows. In block 1501, the component selects the next annotation. In decision block 1502, if all the annotations have already been selected, then the component completes, else the component continues at block 1503. In block 1503, the component extracts a feature vector of features of the selected annotations. The features may include number of strokes in the annotation, relative position of the strokes to each other, widths and lengths of the strokes, characteristics (e.g., height and width) of the bounding rectangle, a mapped grid feature, size of text, and so on. A mapped grid feature maps the strokes of an annotation to a grid with each cell of the grid set to one if ink of the annotation is present and set to zero otherwise. For example, an annotation in the shape of an "X" when mapped to a square grid would have the cells of the diagonals set to one and all other cells set to zero. The feature set used for machine learning and subsequent classification may use any combination of these features such as the mapped grid feature and the height and width of the bounding rectangle features. In block 1504, the component invokes the classifier, passing the feature vector, and receives in return an indication of whether the shape of the annotation was recognized and, if so, the shape. In block 1505, the component sets that shape (e.g., enclosure or unrecognized) of the annotation and loops to block 1501 to select the next annotation.

Figure 16:
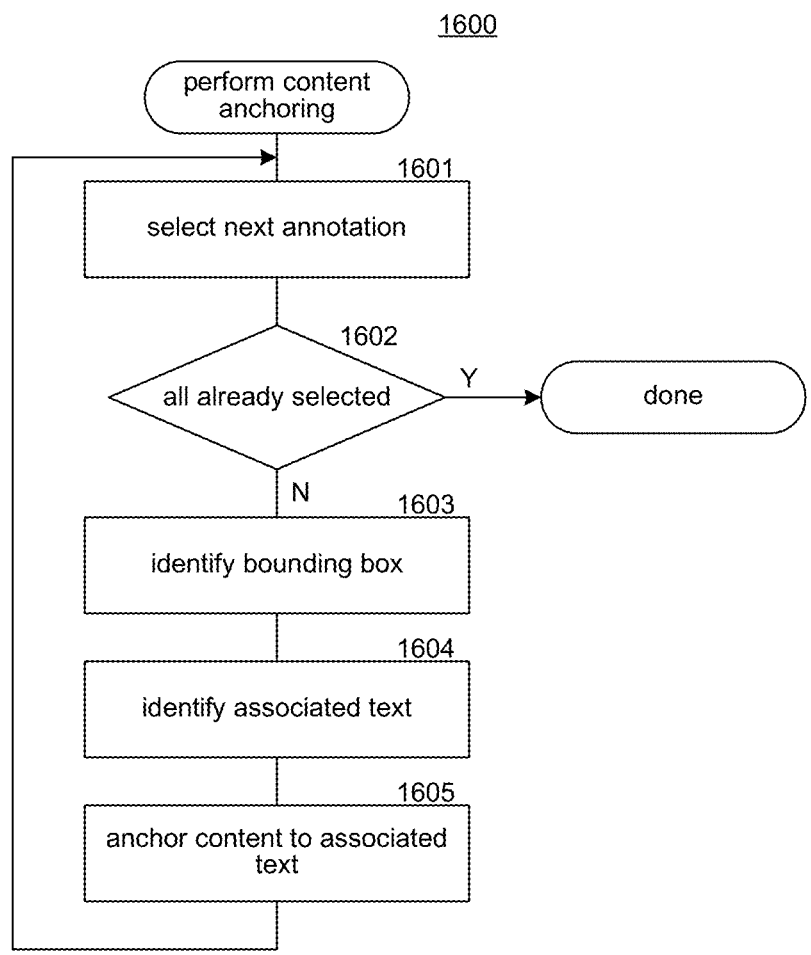
FIG. 16 is a flow diagram that illustrates the processing of a perform content anchoring component of the ink control system in some embodiments.

FIG. 16 is a flow diagram that illustrates the processing of a perform content anchoring component of the ink control system in some embodiments. The component 1600 identifies the content of the document that is associated with each annotation and anchors the annotation to that content. In this example embodiment, the document is assumed to contain only text. In other embodiments, if the document includes others types of content, such as images, then the component may anchor an annotation to a different type of content. In block 1601, the component selects the next annotation. In decision block 1602, if all the annotations have already been selected, then the component completes, else the component continues at block 1603. In block 1603, the component identifies a bounding box for the selected annotation based on the shape of the annotation. For example, if the shape is an underline, then the bounding box may enclose the underline and have a certain height based on font size or scaling of the document. As another example, if the shape overlays content and is not recognized, then the bounding box may be the smallest box that encloses the annotation. As another example, if the shape does not overlay content and is not recognized, then the bounding box may be the size of the smallest box that is large enough to enclose the annotation but that overlays the closest content. For example, if the annotation is in the left margin, then the bounding box would enclose the text by the left margin closest to the annotation. In block 1604, the component identifies the text within the bounding box. The text may be identified by a beginning block and offset and an ending block and offset within a document object model of the document. In block 1605, the component anchors the annotation to the text within the bounding box and then loops to block 1601 to select the next annotation.

Figure 17:
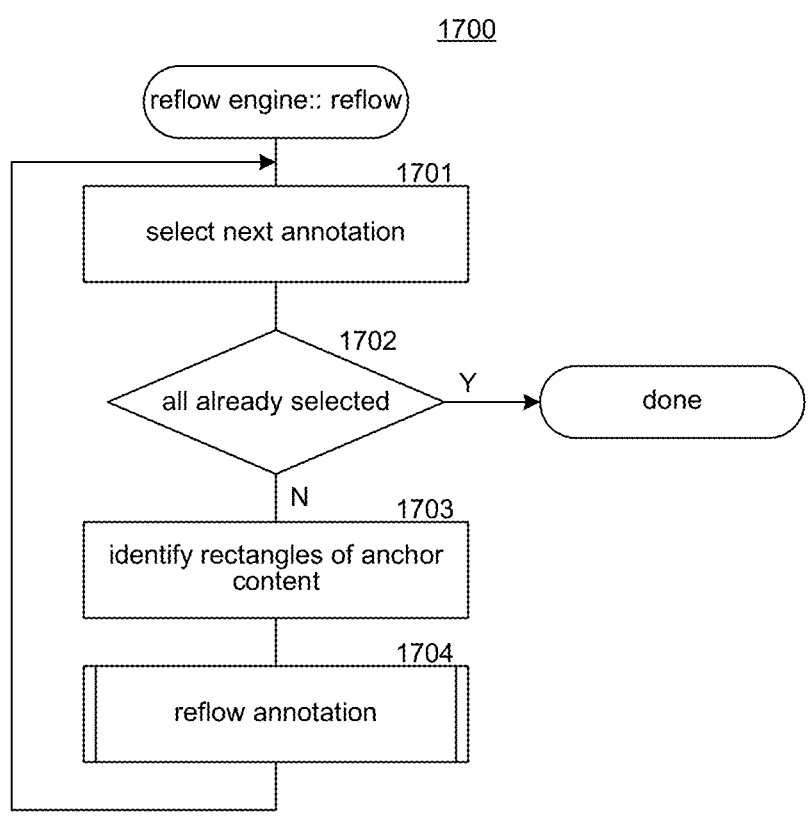
FIG. 17 is a flow diagram that illustrates the processing of a reflow component of the reflow engine component in some embodiments.

FIG. 17 is a flow diagram that illustrates the processing of a reflow component of the reflow engine component in some embodiments. The component 1700 loops, selecting each annotation and modifying the annotations based on the current layout of the document. In block 1701, the component selects the next annotation that would be visible given the current layout and window size. In decision block 1702, if all the annotations have already been selected, then the component completes, else the component continues at block 1703. In block 1703, the component identifies rectangles for positioning the selected annotation based on the anchor content. For example, if the anchor content of an underline previously spanned one line but now spans two lines, the component identifies a rectangle for each line. As another example, if the anchor content is in a margin, the component identifies a rectangle in the margin near the anchor content. In block 1704, the component invokes the reflow annotation component, passing an indication of the selected annotation and the rectangles, and then loops to block 1701 to select the next annotation.

Figure 18:
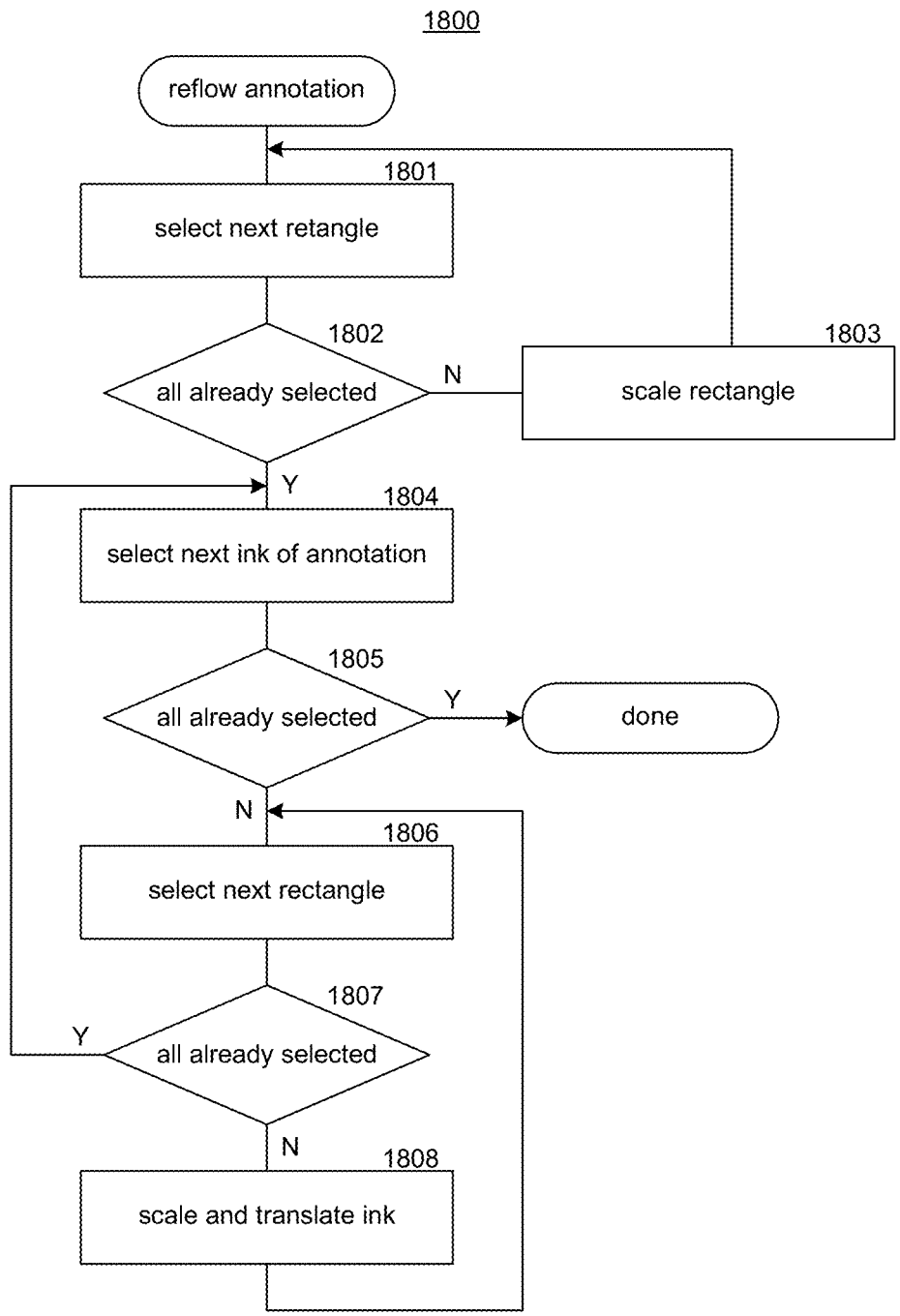
FIG. 18 is a flow diagram that illustrates the processing of a reflow annotation component of the reflow engine component in some embodiments.

FIG. 18 is a flow diagram that illustrates the processing of a reflow annotation component of the reflow engine component in some embodiments. The component 1800 is passed an indication of an annotation and rectangles for the annotation and modifies the annotation based on the rectangles. In block 1801, the component selects the next rectangle. In decision block 1802, if all the rectangles have already been selected, then the component continues at block 1804, else the component continues at block 1803. In block 1803, the component scales the selected rectangle based on the current scaling of the document and then loops to block 1801 to select the next rectangle. In block 1804, the component selects the next ink of the annotation. In decision block 1805, if all the ink has already been selected, then the component completes, else the component continues at block 1806. In block 1806, the component selects the next rectangle. In decision block 1807, if all the rectangles have already been selected, then the component loops to block 1804 to select the next ink of the annotation, else the component continues at block 1808. In block 1808, the component scales and translates the ink so that the ink is mapped into the selected rectangle as appropriate.

Figure 19:
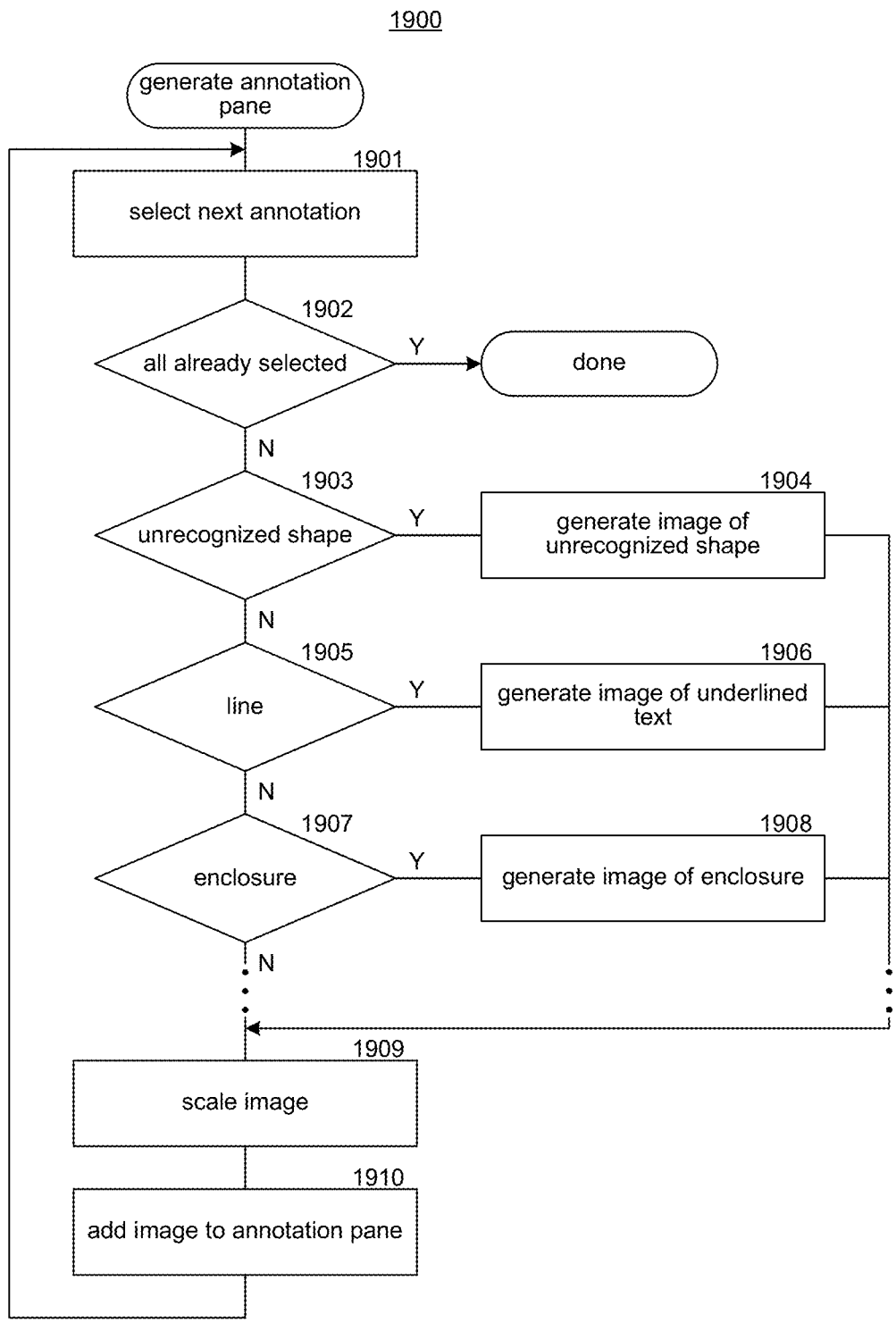
FIG. 19 is a flow diagram that illustrates the processing of a generate annotation pane component of the annotation-enabling code in some embodiments.

FIG. 19 is a flow diagram that illustrates the processing of a generate annotation pane component of the annotation-enabling code in some embodiments. The component 1900 generates an image of each annotation that may include the anchor content and adds that image to the annotation pane. In block 1901, the component selects the next annotation, starting with the first annotation that is visible. In decision block 1902, if all the annotations have already been selected or the annotation pane is full, then the component completes, else the component continues at block 1903. In decision block 1903, if the selected annotation is an unrecognized shape, then the component continues at block 1904 to generate the image for the unrecognized shape, else the component continues at block 1905. For example, if an unrecognized shape overlays the anchor content, then the component generates an image that includes the overlaid anchor content and the annotation. In decision block 1905, if the selected annotation is an underline, then the component continues at block 1906 to generate the image for the underline, else the component continues at block 1907. For example, the component generates an image that includes the underlined content along with the underline. In decision block 1907, if the selected annotation is an enclosure, then the component continues at block 1908 to generate the image for the enclosure, else the component continues at block 1909. For example, the component generates an image that includes the anchor content along with the enclosure. In block 1909, the component scales the image to fit into the annotation pane. In block 1910, the component adds the image to the annotation pane and then loops to block 1901 to select the next annotation. The annotation pane may be implemented as an annotation pane element that is added to the document. The "images" may be sub-elements of the annotation pane that include the anchor content and the ink of the annotation.

Figure 20:
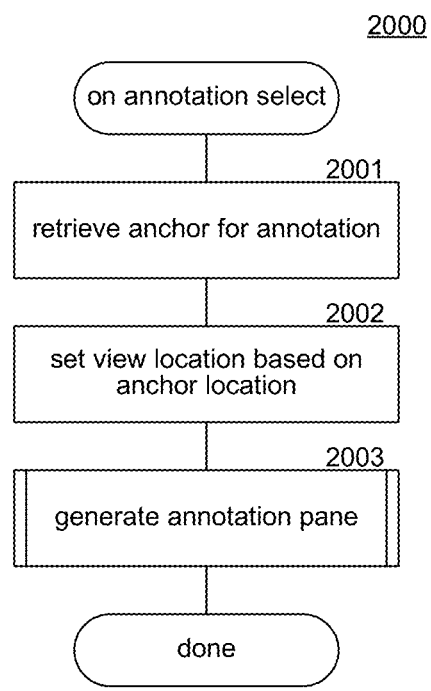
FIG. 20 is a flow diagram that illustrates the processing of an on annotation select component of the annotation-enabling code in some embodiments.

FIG. 20 is a flow diagram that illustrates the processing of an on annotation select component of the annotation-enabling code in some embodiments. The component 2000 is invoked when a user selects an annotation from the annotation pane and sets the start of the visible portion of the rendered document so that the selected annotation is visible. In block 2001, the component retrieves the anchor content location for the annotation. In block 2002, the component sets the start of the visible portion of the rendered document based on the selected annotation. In block 2003, the component invokes the generate annotation pane component to repopulate the annotation pane based on the new start of the visible portion.

In some embodiments, a computing device performs a method for displaying annotations of a document that is in a format of a rendering engine. The method comprises receiving annotations for the document, an annotation submitted to annotate the document at a location within the document, and the annotation corresponding to digital ink placed over a rendering of the document near the location. The method also comprises creating an annotation pane that includes representations of one or more annotations. The method further comprises adding the created annotation pane to the document. The method comprises rendering the document so that content of the document is displayed along with representations of the annotation pane. The annotation pane may be defined by an element of the format of the rendering engine and the adding of the created annotation pane adds the element to the document. The method may create an annotation by a person drawing over a rendering of the document at the location of the annotation. When the annotation is an unrecognized shape, the representation of that annotation may correspond to the unrecognized shape. When the annotation is a recognized shape, the representation of that annotation may include the recognized shape and content of the document associated with the location. The method may include receiving a selection of an annotation from the annotation pane and rendering the document so that content of the document associated with the location of the selected annotation is displayed. The format of the document may also be a document object model format. The rendering of the document also include displaying annotations in association with their locations within the document. The document may be augmented so that the annotations will be displayed at their locations when the document is rendered.

In some embodiments, a computer-readable storage medium stores computer-executable instructions for controlling a computing device to display annotations of a document in a format of a rendering engine. The computer-executable instructions comprise instructions for accessing annotations for the document with an annotation being submitted to annotate the document at a location within the document, and corresponding to digital ink placed over a rendering of the document near the location. The computer-executable instructions further comprise instructions for creating an element for an annotation pane that defines representations of one or more annotations where a representation includes the digital ink of the annotation and instructions for adding the created element to the document so that when the document is rendered, content of the document is displayed along with representations of the annotation pane. In some embodiments, the annotation is created by a person drawing over a rendering of the document at the location of the annotation. When the annotation is an unrecognized shape, the representation of that annotation may correspond to the unrecognized shape. When the annotation is a recognized shape, the representation of that annotation may include the recognized shape and content of the document associated with the location.

In some embodiments, a device is provided for displaying annotations of a document that is in a format of a rendering engine. The device comprises an annotation repository for storing annotations for the document wherein an annotation is submitted to annotate the document at a location within the document, and corresponds to digital ink placed over a rendering of the document near the location. The device further comprises a computer-readable storage medium storing computer-executable instructions of components that create an annotation pane with representations of one or more annotations where a representation includes the digital ink of the annotation, add the created annotation pane to the document, and that render the document so that content of the document is displayed in a document content pane and the representations of the annotations are displayed in the annotation pane. The device further comprises a processor for executing the computer-executable instructions stored in the computer-readable storage medium. In some embodiments, the annotation pane is defined by an element of the format of the rendering engine and the component that adds the created annotation pane may add the element to the document. In some embodiments, an annotation is created by a person drawing over a rendering of the document at the location of the annotation. When the annotation is a recognized shape, the representation of that annotation may include the recognized shape and content of the document associated with the location. The computer-executable instructions may further comprise instructions of a component that, upon detecting that a user has selected an annotation from the annotation pane, render the document in the document content pane so that the content of the selected annotation is visible in the document content pane.

In some embodiments, a computing device performs a method for displaying a document and annotations where an annotation represents digital ink submitted to annotate a rendering of the document and being associated with anchor content and where the document is in a format of a rendering engine. The method also comprises augmenting the document so that the annotations will be displayed in association with the associated anchor content by identifying document display characteristics; and for each annotation, analyzing the document to identify anchor display characteristics of the anchor content when that content is rendered, generating a modified annotation based on the identified document display characteristics and anchor display characteristics, and adding content to the document based on the modified annotation to effect displaying the annotation in accordance with the display characteristics when the document is displayed. The method also comprises, under control of the rendering engine, rendering the augmented document. The method may comprise when the document display characteristics change, re-augmenting the document so that the annotations will be rendered in a manner that factors in the new document display characteristics. In some embodiments, when an annotation is associated with text and the text spans lines when displayed, the added content for the annotation may result in the display of a portion of the annotation on each of the two lines. In some embodiments, a document display characteristic may correspond to a scale of the display of the document. In some embodiments, the format is a document object model format and adding of content adds elements to the document. In some embodiments, each annotation is associated with a region of the document and the regions may include content, left margin, right margin, top margin, bottom margin, and intra-content margin of the document. In some embodiments, when a region is a margin, the adding of content may effect display of the annotation in that margin near the associated anchor content.

In some embodiments, a computer-readable storage medium stores computer-executable instructions for controlling a computing device to augment a document for display of an annotation where the annotation represents digital ink submitted to annotate a rendering of the document and is associated with anchor content and where the document being in a format of a rendering engine. The computer-executable instructions comprises instructions that analyze the document to identify anchor display characteristics of the anchor content when that content is rendered, generate an element representing a modified annotation based on the identified anchor display characteristics, and add the element to the document to effect displaying the annotation in accordance with the anchor display characteristics of the anchor content when the document is displayed. In some embodiments, the computer-executable instructions may include instructions that, when the anchor display characteristics change, re-augment the document so that the annotation will be rendered in a manner that factors in the new anchor display characteristics and when an annotation is associated with text and the text spans multiple lines when displayed, the added content for the annotation may result in the display of a portion of the annotation on each of the multiple lines. In some embodiments, an anchor display characteristic changes as a result of a change in scale of the display of the document. In some embodiments, the format is a document object model format. In some embodiments, the annotation is associated with a region of the document and when the region is a margin, the instructions that add the element may effect display of the annotation in that margin near the associated anchor content.

In some embodiments, a device is provided for rendering a document and annotations where an annotation represents digital ink submitted to annotate a rendering of the document and associated with anchor content within the document and where the document is in a format of a rendering engine. The device comprises a computer-readable storage medium storing computer-executable instructions of a component that augments the document so that the annotations will be displayed in association with the associated anchor content by, for each annotation, analyzing the document to identify anchor display characteristics of the anchor content when that content is rendered; generating a modified annotation based on the identified anchor display characteristics; and adding content to the document based on the modified annotation to effect displaying the annotation in accordance with the anchor display characteristics when the document is displayed. The instructions may further include a component that renders the augmented document to effect the display of the document and the annotations. The device may further comprise a processor for executing the computer-executable instructions stored in the computer-readable storage medium. The instructions may further include a component that, when the anchor display characteristics change, re-augments the document so that the annotations will be rendered factoring in the new anchor display characteristics. In some embodiments, when an annotation is associated with text and the text spans multiple lines when displayed, the added content for the annotation may result in the display of a portion of the annotation on each of the multiple lines. In some embodiments, an anchor display characteristic corresponds to a change in scale of the display of the document. In some embodiments, the content is an element defined by the format of the rendering engine.

In some embodiments, a computing device performs a method for annotating a document that is in a format of a rendering engine. The method comprises accessing a document with document content and augmented with an annotation-enabling code. The method further comprises under control of a rendering engine, when executing the annotation-enabling code, retrieving annotation engine code of an annotation engine; and augmenting the document with annotation engine code. The method further comprises under control of a rendering engine, when executing the annotation engine code, augmenting the document with overlay content that defines an input area to overlay rendered document content and to receive events relating to annotation; enabling the input area to receive events relating to annotations; when inking events corresponding to submitting ink of an annotation are detected over the input area, storing points corresponding to the locations of the submitted ink within the input area; analyzing the stored points of the annotation to identify anchor content based on the locations of the submitted ink and the location of rendered document content; and associating the annotation with the anchor content. In some embodiments, the document is a web page and the annotation-enabling code is added to the web page in response to selection of a bookmarklet when the web page is displayed. In some embodiments, the document is a web page and the annotation-enabling code is added to the web page prior to being served. In some embodiments, the analyzing of the stored points includes grouping the points into ink and grouping the ink into an annotation and may include applying a classifier to determine whether the ink of an annotation represents a recognized shape or an unrecognized shape and the classifier may be trained using machine learning with annotations labeled with their corresponding shape. In some embodiments, the method may include after associating the annotation with the anchor content, adding to the document a rendering element defining the annotation so that the annotation is rendered in association with the anchor content when the document is rendered.

In some embodiments, a computer-readable storage medium stores computer-executable instructions for controlling a computing device to collect annotations to a document that is in a format of a rendering engine. The computer-executable instructions including instructions that access a document with document content and augmented with an annotation code. The instructions further, under control of a rendering engine, when executing the annotation code, augment the document with overlay content that defines an input area to overlay rendered document content and to receive events relating to annotation; enable the input area to receive events relating to annotations; when inking events corresponding to submitting ink of an annotation are detected over the input area, store points corresponding to the locations of the submitted ink within the input area; analyze the stored points of the annotation to identify anchor content based on the locations of the submitted ink and the location of rendered document content; and associate the annotation with the anchor content. In some embodiments, the document is a web page and annotation-enabling code is added to the web page in response to selection of a bookmarklet when the web page is displayed. In some embodiments, the document is a web page and annotation-enabling code is added to the web page prior to being served. In some embodiments, the instructions that analyze group the points into ink and grouping the ink into an annotation. In some embodiments, the instructions that analyze apply a classifier to determine whether the ink of an annotation represents a recognized shape or an unrecognized shape and the classifier may be trained using machine learning with annotations labeled with their corresponding shape. In some embodiments, the instructions further include instructions that, after associating the annotation with the anchor content, add to the document an element defining the annotation so that the annotation is rendered in association with the anchor content when the document is rendered.

In some embodiments, a device is provided for annotating a document that is in a format of a rendering engine. The device comprises a data store storing a document with document content and augmented with an annotation-enabling code; a data store storing annotation engine code; and a rendering engine. When rendering the document, the rendering engine executes the annotation-enabling code to augment the document with annotation engine code; and the annotation engine code to augment the document with overlay content that defines an input area to overlay rendered document content and to receive events relating to annotation; enable the input area to receive events relating to annotations; when inking events corresponding to submitting ink of an annotation are detected over the input area, store points corresponding to the locations of the submitted ink within the input area; analyze the stored points of the annotation to identify anchor content based on the locations of the submitted ink and the location of rendered document content; and associate the annotation with the anchor content. In some embodiments, the document is a web page and the annotation-enabling code is added to the web page in response to selection of a bookmarklet when the web page is displayed. In some embodiments, the document is a web page and the annotation-enabling code is added to the web page prior to being served. In some embodiments, the annotation engine code that analyzes groups the points into strokes of ink and grouping the strokes into an annotation. In some embodiments, the annotation engine includes code to apply a classifier to determine whether the ink of an annotation represents a recognized shape or an unrecognized shaped and the classifier may be trained using machine learning with a feature set that includes a mapped grid feature and a bounding rectangle feature of the annotations and with annotations labeled with their corresponding shape.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the annotation system may specify a region (e.g., left margin, right margin, document body) for each annotation so that the annotation can be rendered in that region regardless of a change in layout resulting from a change in the document display characteristics. As another example, the annotation system may be used to annotate a document (e.g., a pdf document) that is simply a set of images that have the image representation of the text with the text itself as metadata. The metadata may also include the positions of rectangles for displaying the images. With such a document, the annotation system uses the text of the metadata for identifying the anchor points for annotations and for displaying anchored text in an annotation pane. Accordingly, the invention is not limited except as by the appended claims.

We claim:

1. A method performed by a computing device that is a client device for displaying annotations of a document that is a web page, the document being in a format of a rendering engine, the method comprising:
    downloading the document from a web server to the computing device;
    augmenting the downloaded document with an annotation code, the annotation code executed as the document is downloaded and rendered;
    receiving annotations for the document, wherein each of the received annotations is associated with a location within the document, the received annotations comprising a first annotation submitted to annotate the document at a first location within the document, and the first annotation corresponding to digital ink placed over a rendering of the document near the first location;
    determining, via the annotation code, an anchor content element associated with each location of the received annotations;
    creating an HTML element for an annotation pane that includes representations of the received annotations and the anchor content element associated with the received annotations;
    adding the created HTML element for the annotation pane to the document; and
    displaying the document with the added HTML element so that content of the document is displayed simultaneously with the annotation pane with representations of the received annotations and the anchor content element associated with the received annotations.

2. The method of claim 1 wherein the adding of the created annotation pane adds the element to the document.

3. The method of claim 1 wherein the first annotation is created by a person drawing over a rendering of the document at the location of the first annotation.

4. The method of claim 1 wherein when the first annotation is an unrecognized shape, the representation of the first annotation corresponds to the unrecognized shape.

5. The method of claim 1 wherein when the first annotation is a recognized shape, the representation of the first annotation includes the recognized shape and content of the document associated with the location.

6. The method of claim 1 including:
    receiving a selection of a second annotation from the annotation pane; and
    rendering the document so that content of the document associated with the location of the selected second annotation is displayed.

7. The method of claim 1 wherein the format of the document is a document object model format.

8. The method of claim 1 wherein the rendering of the document includes displaying a plurality of annotations in association with their locations within the document.

9. The method of claim 8 wherein the document is augmented so that the plurality of annotations will be displayed at their locations when the document is rendered.

10. The method of claim 1 wherein the document is augmented with the annotation code prior to being downloaded.

11. The method of claim 1 wherein the document is augmented with the annotation code after being downloaded.

12. A computer-readable storage medium storing computer-executable instructions of a document for controlling a computing device to display annotations of the document, the document being in a markup language format of a rendering engine, the computer-executable instructions comprising:
    instructions for, downloading the document from a web server to the computing device, augmenting the downloaded document with an annotation code executing as the document is downloaded and rendered, during rendering of the document for a the user, accessing a plurality of annotations for the document wherein each of the plurality of annotations is associated with a location within the document, a first annotation is submitted to annotate the document at a first location within the document, and corresponding to digital ink placed over a rendering of the document near the first location;
    instructions for, during rendering of the document for the user, determining via the annotation code, an anchor content element associated with each location associated with the plurality of annotations;
    instructions for, during rendering of the document for the user, creating a HTML element for an annotation pane that defines representations of the received annotations and the anchor content element associated with the received annotations, a representation including the digital ink of the annotation; and
    instructions for, during rendering of the document for the user, adding the created element to the document so that during rendering of the document for the user, the instructions for creating the HTML element are executed to add the created HTML element to the document and content of the document is displayed simultaneously with the annotation pane with the representations of the annotations and the anchor content element associated with the received annotations.

13. The computer-readable storage medium of claim 12 wherein the first annotation is created by a person drawing over a rendering of the document at the location of the annotation.

14. The computer-readable storage medium of claim 12 wherein when the first annotation is an unrecognized shape, the representation of that annotation corresponds to the unrecognized shape.

15. The computer-readable storage medium of claim 12 wherein when the first annotation is a recognized shape, the representation of that annotation includes the recognized shape and content of the document associated with the location.

16. A device for displaying annotations of a document, the document being in a markup language format of a rendering engine, the device comprising:
    an annotation repository for storing a plurality of annotations for the document wherein each of the plurality of annotations is associated with a location within the document, a first annotation submitted to annotate the document at a first location within the document, and corresponding to digital ink placed over a rendering of the document near the first location;

a computer-readable storage medium storing computer-executable instructions that include:

a first component that downloads the document to the device;

a second component of the document that includes an annotation code executed as the document is downloaded and rendered, the annotation code is part of the document to determine an anchor content element associated with each location of the received annotations, create an annotation pane with representations of one or more annotations and the associated anchor content element, a representation including digital ink of the annotation and that, after creating the annotation pane, to add the created annotation pane to the document; and a third component that renders the document so that content of the document is displayed in a document content pane and the representations of the one or more annotations and the anchor content element are displayed in the annotation pane, wherein the document content pane and the annotation pane are displayed simultaneously; and a processor for executing the computer-executable instructions stored in the computer-readable storage medium.

17. The device of claim 16 wherein the annotation pane is defined by a HTML element of the format of the rendering engine.

18. The device of claim 17 wherein the component that adds the created annotation pane adds the HTML element to the document.

19. The device of claim 16 wherein the first annotation is created by a person drawing over a rendering of the document at the location of the annotation.

20. The device of claim 16 wherein when the first annotation is a recognized shape, the representation of that first annotation includes the recognized shape and content of the document associated with the location.

21. The device of claim 16 including instructions of a component that, upon detecting that a user has selected a second annotation from the annotation pane, render the document in the document content pane so that the content of the selected second annotation is visible in the document content pane.

22. The computer-readable storage medium of claim 16 wherein the annotation code is added to the document prior to the document being downloaded.

23. The computer-readable storage medium of claim 16 wherein the annotation code is added to the document after the document being downloaded.

* * * * *